PRINTED CIRCUIT BOARD AND LAMP SOCKET COMBINATION

Filed Dec. 28, 1961

Inventor:
John Marno 2nd,
by Gordon Needleman
Att'y.

United States Patent Office 3,218,598
Patented Nov. 16, 1965

3,218,598
PRINTED CIRCUIT BOARD AND LAMP SOCKET COMBINATION

John Marno 2nd, Swampscott, Mass., assignor to United-Carr Incorporated, a corporation of Delaware Filed Dec. 28, 1961, Ser. No. 162,711
2 Claims. (Cl. 339—17)

This invention relates to lamp sockets and particularly to lamp sockets mounted in association with a printed circuit board.

An object of the invention is to provide a lamp socket formed of sheet metal for association with a printed circuit.

A further object is to provide a sheet metal socket having a flexible body portion and louvers formed in the body portion.

Other objects of the invention will, in part, be obvious, and will, in part, appear hereinatfer.

Figure 1:
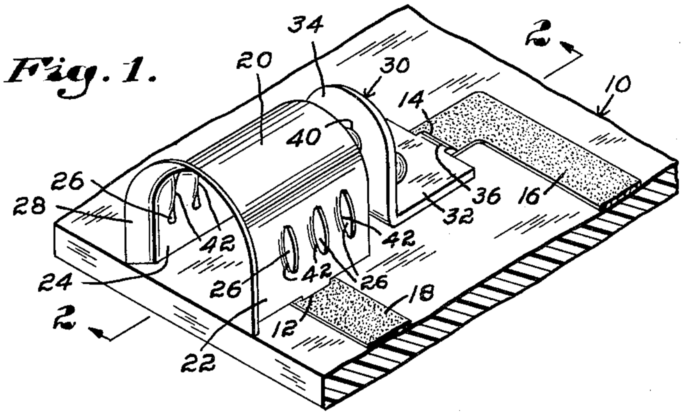
FIG. 1 is a drawing in perspective of the socket engaged to a printed circuit board, the board being broken off.
Figure 2:
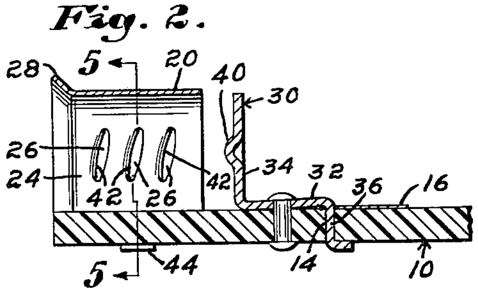
FIG. 2 is a section taken on line 2—2 of FIG. 1.

Referring to FIG. 1, there is shown the new socket attached to a printed circuit board, the printed circuit board having three slots 12, 13 and 14. The slots 12 and 14 are formed through circuit contact elements 16 and 18 respectively which are superposed or set in a channel on the base 10 of the circuit board.

Figure 3:
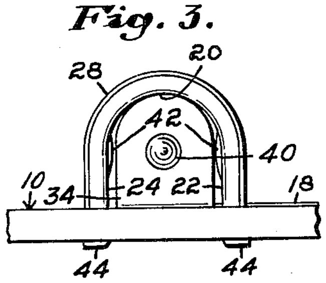
FIG. 3 is an end view in elevation of the socket and board shown in FIG. 1.

The socket comprises an arcuate bight portion 20 and a first wall 22 and a second wall 24, integral with said bight portion 20 and in spaced substantially parallel relationship with each other as shown in FIGS. 1 and 3. The bight portion 20, first wall 22 and second wall 24 form a semicircular housing or body portion. A series of louvers 26 are formed in the first wall 22 and in the second wall 24 in angular relationship to an axis drawn through the socket. The series of louvers formed on the first wall 22 and the second wall 24 are in staggered relation to each other. It is convenient that a terminal end portion of the first and second walls and the bight portion be bent away from the axis of the socket to provide a lead element 28. As a matter of convenience, the lead element 28 may be placed on the circuit board 10 to provide either a slight overhang to the edge of the circuit board or to lie in the plane formed by the edge of the circuit board as shown in FIG. 1. In the embodiment shown in FIG. 1, the socket is provided with two openings and utilizes the circuit board as an operating part of the socket proper. It would be possible, if required, that one series of louvers be formed in the bight portion and a series of louvers be formed on the circuit board itself. This would considerably reduce the resiliency provided by having the louvers formed on the first and second walls and would also require that a contact element be extended within the area encompassed by the first and second walls, as will be explained hereinafter.

The bulb-engaging element 30 comprises a conductive material formed into right angle configuration spaced from the socket body. This bulb-engaging element 30 comprises a base portion 32, and a contact leg 34 formed in right angle relationship to one side of the base portion 32. The bulb-engaging element 30 is fixed on the circuit board in right angle relation to a plane drawn through the axis of the socket body as shown in FIG. 1. There are numerous methods of engaging the bulb-engaging element 30 with a circuit contact element 16 of the printed circuit board 10. The inventor has utilized a tab 36 formed on an opposite edge of said base portion 32 from said contact leg 34 and bent through the slot 14 formed in the printed circuit board to provide an electrical engagement between the bulb-engaging element 30 and the circuit contact element 16.

Figures 4, 5, 6:
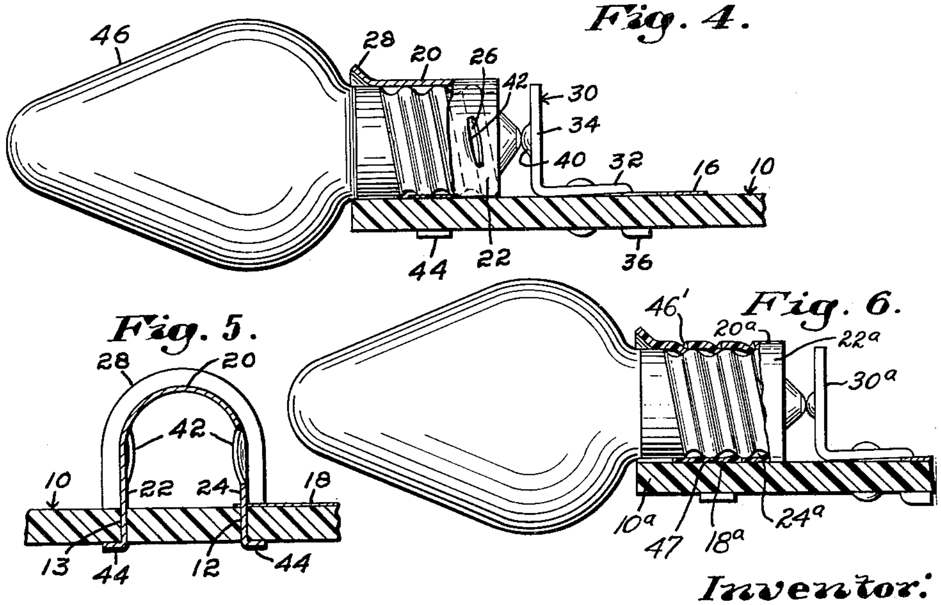
FIG. 4 is a side elevation of the socket and printed circuit board shown in FIG. 1 engaged with a bulb, the socket body shown in side elevation and partly in section.
FIG. 5 is a section taken on line 5—5 of FIG. 2.
FIG. 6 is a side elevation with the printed circuit board in section and the socket partly in section.

The free terminal end of each of the walls 22 and 24 is provided with an extension 44 which is preferably rectangular in shape although the geometric configuration may be varied to meet the requirements of the slot with which it will be engaged. In the embodiment shown in the drawing, the extension 44 of the first wall 22 is passed through a slot formed through the circuit contact element 18 and also through the base 10 and then bent under the circuit board (FIG. 5). The extension 44 of the second wall 24 is also passed through a slot 13, in this particular case through the base 10 only and then bent to complete the engagement of the unit comprising the bight portion 20, the first wall 22 and the second wall 24 with the base. Each of the louvers 26 has a lip element 42 which is extended into the area in between the area encompassed by the first wall 22 and the second wall 24. The planes of the lip elements 42 are in spaced angular relationship with the axis of the body portion of the socket. The bulb-engaging element 30 has a protuberance 40 formed on its contact leg 34. This protruberance 40 is placed in such a way as to extend toward the area encompassed by the walls 22 and 24 and to have a center point coincident with the axis of the arc formed by the bight portion 20, the first wall 22 and a second wall 24.

To engage a bulb 46 having a screw-on base with the socket and its co-operating printed circuit board, the channels of the screw base of the bulb 46 are engaged on the staggered lip elements 42, which in effect, serve as threads for such an engagement. Engagement continues until the contact on the bulb engages the protruberance 40 on the bulb-engaging element 30. At this time, a complete electrical circuit is formed and the bulb may be lit. With the applicant's arrangement, the bulb-engaging element 30 may be spaced from the remaining parts of the socket, or may be an integral part of the socket depending on the desired configuration.

It is possible, if desired, as shown in FIG. 6 that the bight portion **20*a* and the walls 22*a* and 24*a* be formed of a non-conductive material. Louvers would then be formed in the bight portion 20*a* in spaced relationship to the base 10*a*. The circuit contact element 18*a* would be brought under the first wall 22*a* and then extended for a short distance in spaced parallel relationship to the axis of the body of the socket. Slots or louvers 46' and 47 would then be formed in the portion of the circuit contact element 18*a* within the area defined by the walls 22*a* and 24*a* in spaced, staggered relationship to the louvers formed in the bight portion 20*a*. The bulb-engaging element 30*a*** would be spaced from the remaining portion of the socket in substantially the same manner as indicated in FIG. 1. In this case, the main portion of the socket would not be electrically conductive as was suggested for the embodiment indicated in FIGS. 1 through 5.

Since certain other obvious modifications may be made in this device without departing from the scope of the invention, it is intended that all matters contained herein be interpreted in an illustrative and not in a limiting sense.

I claim:

1. The combination of a printed circuit board and a socket, said socket comprising a contact element and a body portion open at both ends, said body portion comprising an arced bight portion, a first wall and a second wall both formed of electrically conductive material and both integral with said bight portion and in spaced substantially parallel relationship with each other, said first and second walls having a series of louvers formed therethrough, each of said louvers in spaced angular relation with the axis of said body portion and said louvers formed through said first wall in staggered relation to the louvers formed on said second wall, and a tab formed integral with said first wall and said second wall, said contact element having means for electrically engaging said printed circuit board, said printed circuit board having electrical conductive elements adapted thereto and one of said tabs electrically engaging one of said conductive elements.

2. The combination of a printed circuit board and a socket, said socket comprising a contact element and a non-conductive body portion open at both ends, said body portion comprising an arced bight portion, a first wall and a second wall, both of said walls integral with said bight portion and in spaced substantially parallel relationship with each other, said walls having means for engaging said circuit board, said bight portion having a series of louvers formed therein, and said printed circuit board having an electrically conductive element engaged therewith, and extending within the area defined by said socket, said electrically conductive element having a series of spaced louvers formed therein, said louvers formed in said electrically conductive element in staggered relation to the louvers formed in said bight portion and said contact element being spaced from said housing and electrically engaging said printed circuit board.

References Cited by the Examiner

UNITED STATES PATENTS

| | | | |
|---|---|---|---|
| 688,360 | 12/1901 | Stone. | |
| 1,909,140 | 5/1933 | Wermine | 339—112 |
| 2,452,806 | 11/1948 | Tetzlaff | 24—274 |
| 2,693,584 | 11/1954 | Pifer | 339—17 |
| 2,745,094 | 5/1956 | Harrington et al. | 339—176 X |
| 2,818,764 | 1958 | Switzer. | |
| 2,834,922 | 5/1958 | Selgin | 339—193 X |
| 2,958,065 | 10/1960 | Flanagan | 339—17 |
| 3,006,003 | 10/1961 | Johnson. | |

ALBERT H. KAMPE, *Primary Examiner.*

JOSEPH D. SEERS, ALFRED S. TRASK, *Examiners.*